(12) United States Patent
Luo

(10) Patent No.: US 11,912,079 B1
(45) Date of Patent: Feb. 27, 2024

(54) HITCHING HOOK DEVICE

(71) Applicant: Ting Luo, Jinhua (CN)

(72) Inventor: Ting Luo, Jinhua (CN)

( * ) Notice: Subject to any disclaimer, the term of this patent is extended or adjusted under 35 U.S.C. 154(b) by 0 days.

(21) Appl. No.: 18/387,225

(22) Filed: Nov. 6, 2023

(30) Foreign Application Priority Data

Oct. 13, 2023 (CN) .......................... 202322756689.8

(51) Int. Cl.
*B60D 1/06* (2006.01)
*B60D 1/46* (2006.01)

(52) U.S. Cl.
CPC .................... *B60D 1/06* (2013.01); *B60D 1/46* (2013.01)

(58) Field of Classification Search
CPC .................... B60D 1/06; B60D 1/46
See application file for complete search history.

(56) References Cited

U.S. PATENT DOCUMENTS

| | | | | |
|---|---|---|---|---|
| 8,979,112 B2 * | 3/2015 | Weipert | .................... | B60D 1/54 280/491.5 |
| 9,193,234 B1 * | 11/2015 | Angel | ...................... | B60D 1/46 |
| 9,844,986 B2 * | 12/2017 | Harper | ...................... | B60D 1/46 |
| 10,857,846 B1 * | 12/2020 | Jacobs | ...................... | B60D 1/06 |
| 11,345,200 B2 * | 5/2022 | Draper | ...................... | B60D 1/24 |
| 11,446,973 B1 * | 9/2022 | Tang | ........................ | B60D 1/249 |
| 11,453,260 B2 * | 9/2022 | Works | ..................... | B60D 1/065 |
| 2009/0295123 A1 * | 12/2009 | Good | ...................... | B60D 1/583 280/490.1 |
| 2018/0265007 A1 * | 9/2018 | Good | ........................ | B60R 3/007 |
| 2021/0237524 A1 * | 8/2021 | Singh | ....................... | B60D 1/46 |

* cited by examiner

*Primary Examiner* — Tony H Winner
(74) *Attorney, Agent, or Firm* — WPAT, P.C

(57) ABSTRACT

A new type of a hitching hook device includes a hitching ball body and a hitching arm, the hitching arm includes a square steel configured to connect to a vehicle receiver, and the hitching ball body includes at least one hitching ball. The hitching ball body includes a holding jaw, and at least a horizontal clamping groove is defined on the holding jaw. The hitching arm includes at least two square grooves, a fixing plate is disposed between adjacent two square grooves, and a latch is disposed on a top of the hitching arm. The holding jaw of the hitching ball body is clamped to the fixing plate through the horizontal clamping groove, and the latch extends from the top of the hitching arm to a bottom of the hitching arm by passing through the holding jaw. The hitching hook device is tool with many advantages improving work efficiency.

16 Claims, 7 Drawing Sheets

HITCHING HOOK DEVICE

TECHNICAL FIELD

The disclosure relates to the technical field of connecting device for hitching recreational vehicle (RV), and particularly to a hitching hook device.

BACKGROUND

The hitching recreational vehicles do not have an independent drive system and need to be connected to the hitching vehicle through a connecting device, which provides the driving force to drive.

The structures of the connecting device have a directly impact on connection stability between the hitching recreational vehicles and hitching vehicles, the trailer hitches of the connecting device are generally fixed on the rear bumper of the hitching vehicle in the prior art, and the carrying capacity of the trailer hitches is concentrated at a point on the rear bumper of the hitching vehicle, which makes the connection stability lower.

In addition, in the prior art, some of the hitching hook devices include the hitching ball body and the hitching arm, the hitching arm includes a vertical groove, the hitching ball body is disposed in the vertical groove, and the hitching ball body is connected to two sides of the vertical groove through the pin shaft, which makes the structure unreasonable. Therefore, the use of the hitching hook device is not flexible enough for assembly and disassembly, and is inconvenient to use, resulting in long installation and disassembly time and low work efficiency.

SUMMARY

The main purpose of the disclosure is to provide a new type of a hitching hook device with reasonable structure, strong practicality, flexible installation and disassembly, convenient use, and improved work efficiency.

The new type of the hitching hook device includes a hitching ball body and a hitching arm. The hitching arm includes a square steel configured to connect to a vehicle receiver, and the hitching ball body includes at least one hitching ball. The hitching ball body includes a holding jaw, and at least a horizontal clamping groove is horizontally defined on the holding jaw. The hitching arm defines at least two square grooves, a fixing plate is disposed between adjacent two square grooves, and a latch is disposed on a top of the hitching arm; the holding jaw of the hitching ball body is clamped to the fixing plate through the horizontal clamping groove, and the latch extends from the top of the hitching arm to a bottom of the hitching arm by passing through the holding jaw.

In an embodiment, at least one hitching ball includes two hitching ball, and the two hitching ball are respectively disposed up and down on the hitching ball body.

In an embodiment, the at least two square grooves include four square grooves, six square grooves or eight square grooves, and the fixed plate is disposed between every adjacent two of the at least two square grooves.

In an embodiment, two vertical clamping grooves are defined on two sides of the holding jaw of the hitching ball body, and the two vertical clamping grooves are disposed on disposed on upper and lower ends of the clamping groove; the two vertical clamping grooves are clamped to side plates of two sides of one of the at least two square grooves.

In an embodiment, a top end of the latch is provided with a pulling ring, and a bottom end of the latch is provided with a first R-shaped pin.

In an embodiment, the pulling ring includes a resilient open pin shaft, and the pulling ring is connected to the top end of the latch through the resilient open pin shaft.

In an embodiment, rubber rings are disposed on the square steel.

In an embodiment, an iron ring is disposed on the square steel, and the iron ring abuts against the rubber rings.

In an embodiment, a receiver pin configured to connect to the vehicle receiver is disposed in the square steel.

In an embodiment, a second R-shaped pin is disposed on the receiver pin.

The beneficial technical effects of the disclosure are as follows: the new type of the hitching hook device includes the hitching ball body and the hitching arm, the hitching ball body includes a holding jaw, and at least a horizontal clamping groove is defined on the holding jaw. The hitching arm defines at least two square grooves, a fixing plate is disposed between the adjacent two square grooves, and a latch is disposed on a top of the hitching arm. The holding jaw of the hitching ball body is clamped to the fixing plate through the horizontal clamping groove, and the latch extends from the top of the hitching arm to a bottom of the hitching arm by passing through the holding jaw.

Through the above structural arrangement, the assembly and disassembly of the hitching hook device of the disclosure are more flexible and convenient, the structure is more reasonable, and the work efficiency is improved.

The hitching hook device has a strong practicality, a high safety and a reliability, and is suitable for widespread promotion and use.

BRIEF DESCRIPTION OF DRAWINGS

In order to provide a clearer explanation of the embodiments of the disclosure or the technical solutions in the prior art, a brief introduction will be given to the attached drawings required in the description of the embodiments or the prior art. It is evident that the attached drawings in the following description are only some of the embodiments of the disclosure. For those skilled in the art, other attached drawings can be obtained based on the structures shown in the drawings without any creative effort.

Figure 1:
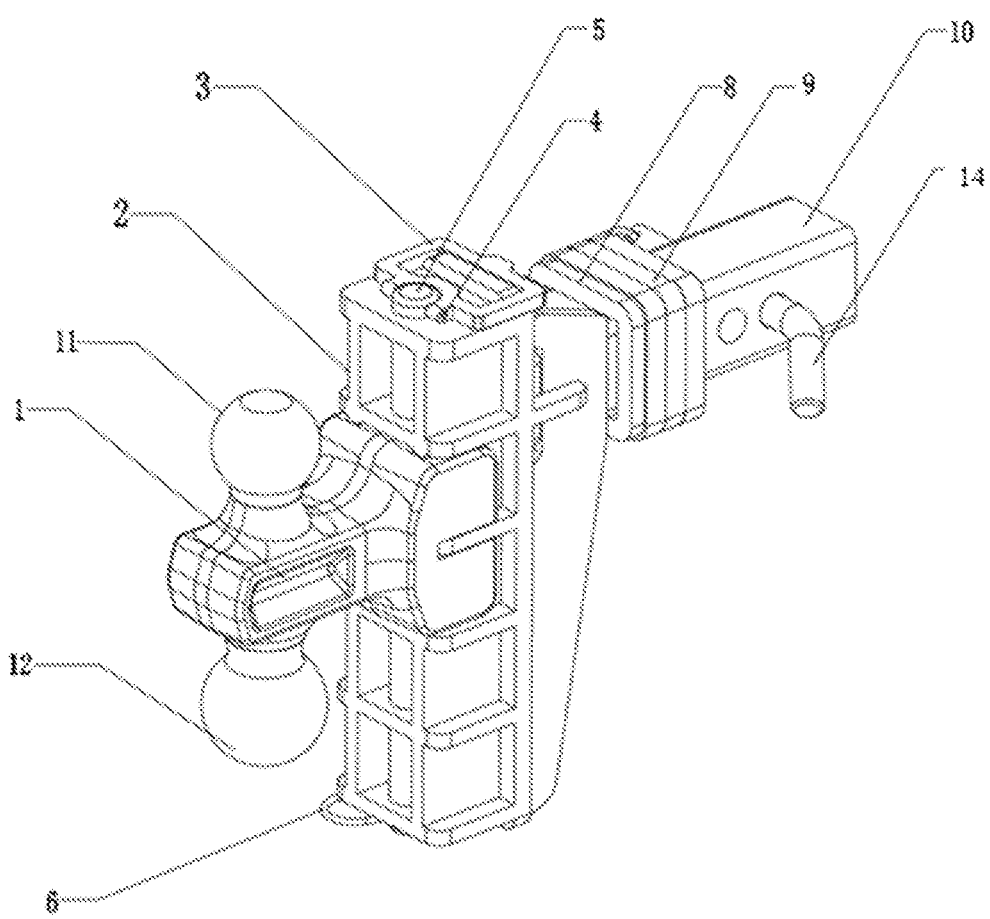
FIG. 1 illustrates a structural schematic diagram of a hitching hook device in an embodiment of the disclosure.
Figure 2:
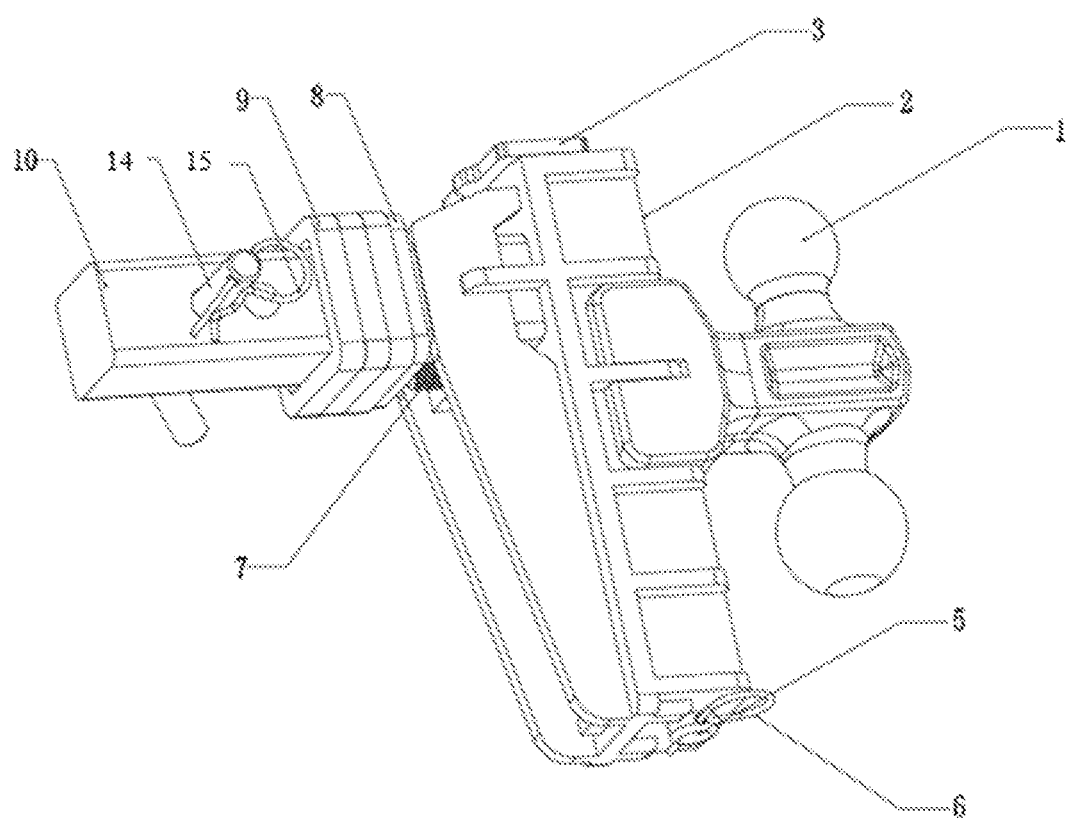
FIG. 2 illustrates another structural schematic diagram of the hitching hook device in the embodiment of the disclosure.
Figure 3:
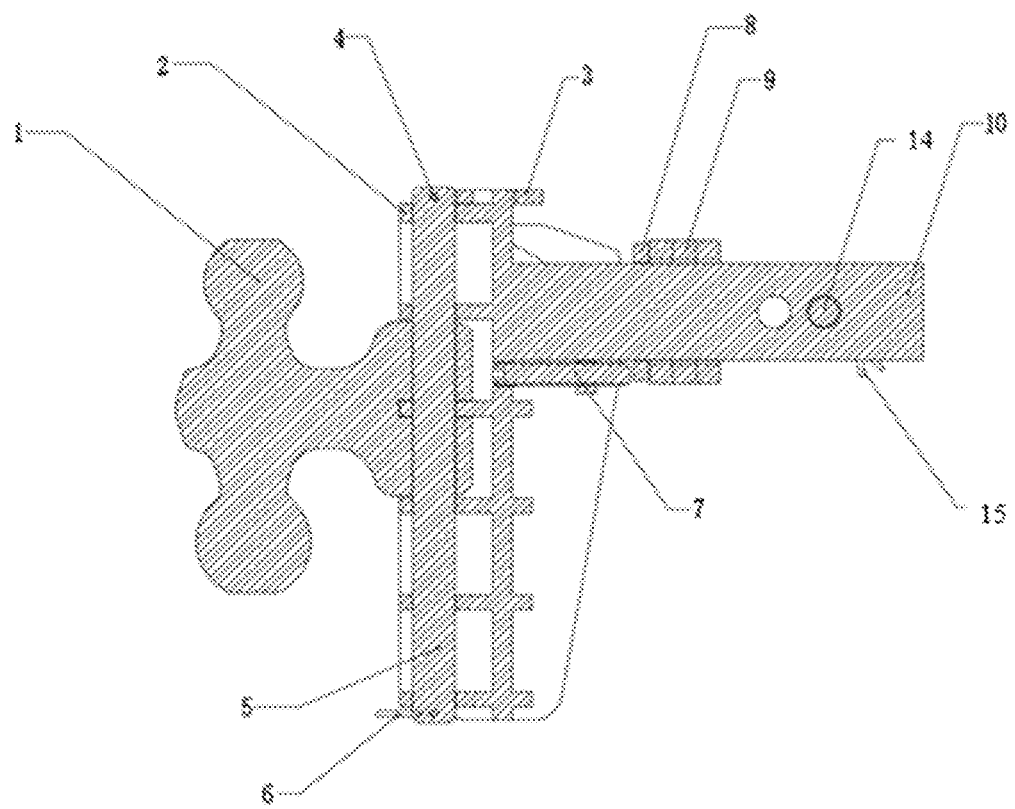
FIG. 3 illustrates a section schematic diagram of the hitching hook device in the embodiment of the disclosure.

The implementation, functional features, and advantages of the disclosure will be further explained in conjunction with the embodiments, with reference to the attached drawings.

DETAILED DESCRIPTION OF EMBODIMENTS

The following will provide a clear and complete description of the technical solution in the embodiments of the disclosure in conjunction with the attached drawings. Obviously, the described embodiments are only a part of the embodiments of the disclosure, not all of them. Based on the embodiments in the disclosure, all other embodiments obtained by those skilled in the art without creative labor fall within the scope of protection of the disclosure.

It should be noted that all directional indications (such as up, down, left, right, front, rear . . . ) in the embodiments of the disclosure are only used to explain the relative position relationship, motion situation among components in a specific posture (as shown in the attached drawings). If the specific posture changes, the directional indication also changes accordingly.

In the disclosure, unless otherwise clearly defined and limited, the terms "connection" and "fixed" should be understood broadly, for example, "fixed" can be a fixed connection, a detachable connection, or a whole; it can be a mechanical connection or an electrical connection; it can be directly connected or indirectly connected through an intermediate medium, which can be the internal connection between two components or the interaction relationship between two components, unless otherwise specified. For those skilled in the art, the specific meanings of the above terms in the disclosure can be understood based on specific circumstances.

In addition, if there are descriptions of "first" and "second" in the embodiments of disclosure, the descriptions of "first" and "second" are only used for descriptive purposes and cannot be understood as indicating or implying their relative importance or implying the number of indicated technical features. Therefore, features limited to "first" and "second" can explicitly or implicitly include at least one of these features. Moreover, the meaning of "and/or" appearing in the entire text includes three parallel schemes. Taking "A and/or B" as an example, it includes a scheme A, or a scheme B, or a scheme that both includes A and B. And the technical solutions between various embodiments can be combined with each other, but must be based on the ability of those skilled in the art to achieve. When the combination of technical solutions conflicts or cannot be achieved, it should be considered that the combination of such technical solutions does not exist and is not within the protection scope required by the disclosure.

The disclosure provides a hitching hook device.

Embodiment 1

In an embodiment, as shown in FIGS. 1-7, the hitching hook device includes a hitching ball body 1 and a hitching arm 2, the hitching arm 2 includes a square steel 10 configured to connect to a vehicle receiver, and the hitching ball body 1 includes at least one first hitching ball 11. The hitching ball body includes a holding jaw 13, and at least one horizontal clamping groove 131 is horizontally defined on the holding jaw 13. In an embodiment, four horizontal clamping grooves 131, six horizontal clamping grooves 131 or eight horizontal clamping grooves 131 are defined on the holding jaw 13 according to the actual needs, that is to say, multiple horizontal clamping grooves 131 can be disposed. The hitching arm 2 includes at least two square grooves including a first square groove 21 and a second square groove 22, a first fixing plate 211 is disposed between the first square groove 21 and the second square groove 22, and a first fixing hole 212 is defined on the first fixing plate 211. A latch 5 is disposed in a top of the hitching arm 2. The holding jaw 13 of the hitching ball body 1 is clamped to the first fixing plate 211 through the horizontal clamping groove 131, and the latch 5 extends from the top of the hitching arm 2 to a bottom of the hitching arm 2 by passing through the holding jaw 13.

In the embodiment, the hitching ball body 1 includes two hitching ball including the first hitching ball 11 and a second hitching ball 12, the first hitching ball 11 and the second hitching ball 12 are respectively disposed up and down on the hitching ball body 1. According to the actual needs, multiple hitching balls can be disposed on the hitching ball body 1, and the hitching balls are used to connect a traction device of the recreational vehicle (RV).

In the embodiment, four square grooves, six square grooves or eight square grooves are defined on the hitching arm 2, and the fixed plate is disposed every adjacent two of the at least two square grooves. According to the actual needs, multiple square grooves can be disposed on the hitching arm 2.

Figure 6:
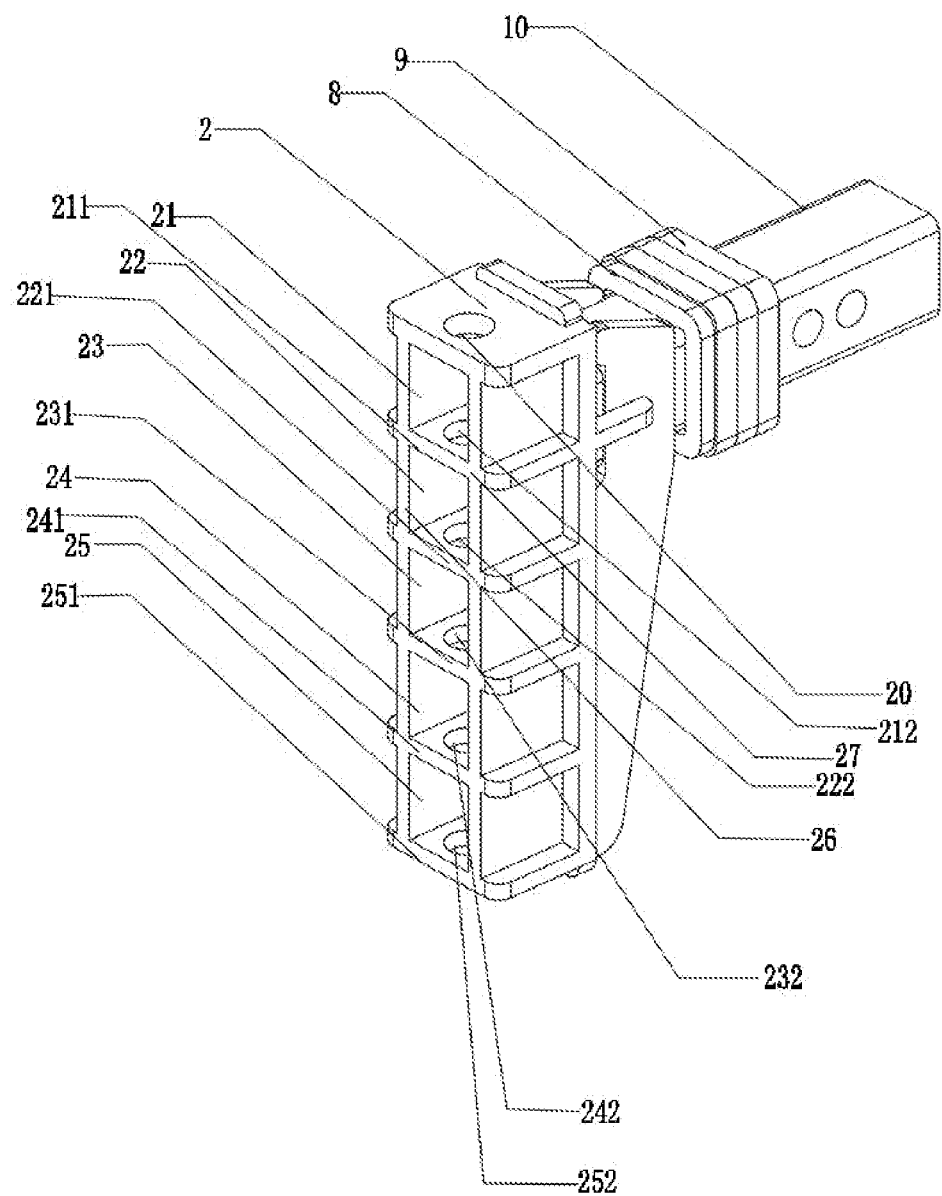
FIG. 6 illustrates a structural schematic diagram of a hitching arm in the embodiment of the disclosure.
Figure 7:
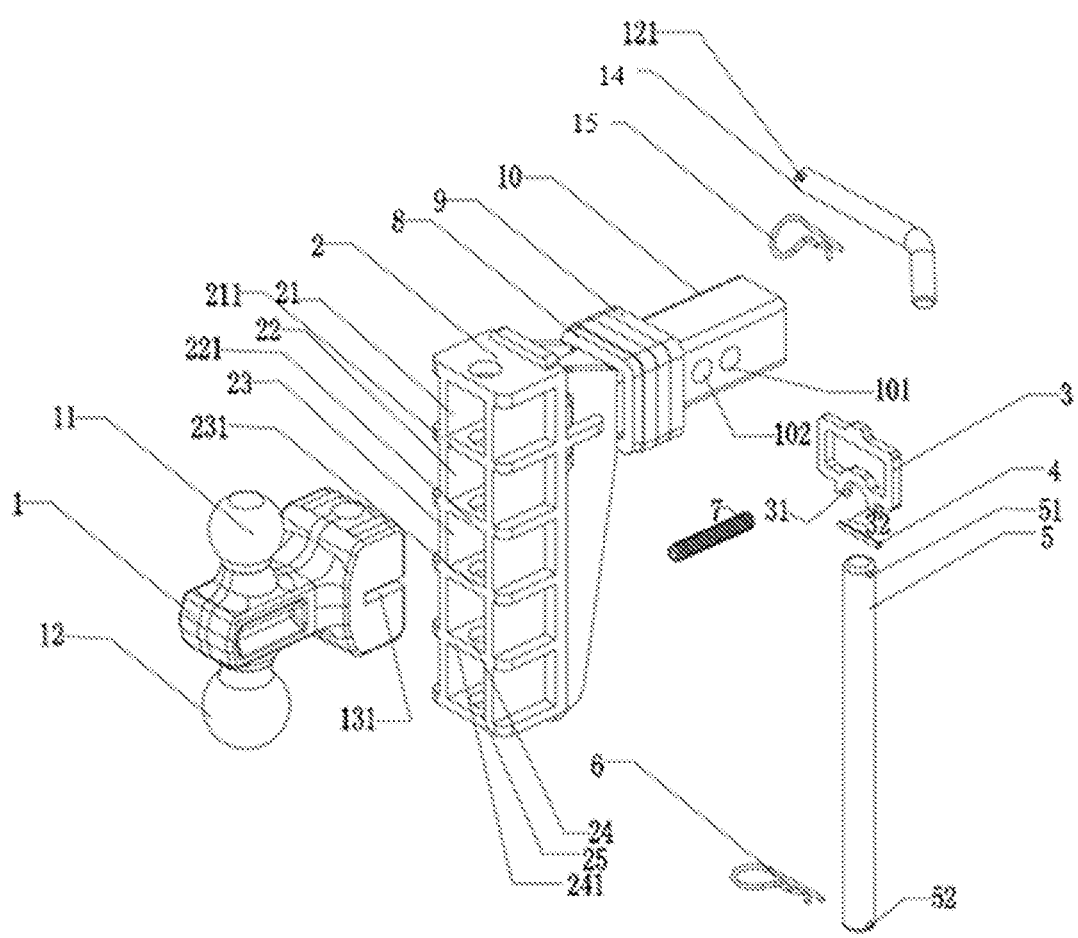
FIG. 7 illustrates an exploded diagram of the hitching hook device in the embodiment of the disclosure.

In the embodiment, as shown in FIG. 6, the first square groove 21, the second square groove 22, a third square groove 23, a fourth square groove 24 and a fifth square groove 25 are disposed on the hitching arm 2. The first fixing plate 211 is disposed between the first square groove 21 and the second square groove 22, and the first fixing hole 212 is defined on the first fixing plate 211. A second fixing plate 221 is disposed between the second square groove 22 and the third square groove 23, and a second fixing hole 222 is defined on the second fixing plate 221. A third fixing plate 231 is disposed between the third square groove 23 and the fourth square groove 24, and a third fixing hole 232 is defined on the third fixing plate 231. A fourth fixing plate 241 is disposed between the fourth square groove 24 and the fifth square groove and a fourth fixing hole 242 is defined on the fourth fixing plate 241. A fifth fixing plate 251 is disposed on a bottom of a fifth square groove 25, and a fifth fixing hole 252 is defined on the fifth fixing plate 251.

In the embodiment, as shown in FIGS. 1-7, a first latch hole 20 is define on the top of the hitching arm 2, a first through hole 132 is defined on a top of the holding jaw 13, and a second through hole 133 is defined on the horizontal clamping groove 131 of the holding jaw 13.

When the horizontal clamping groove 131 of the holding jaw 13 of the hitching ball body 1 is clamped on the second fixing plate 221, the latch 5 passes through the first fixing hole 212 through the first latch hole 20, then passes through the first through hole 132, the second fixing hole 222 and the second through hole 133 of the holding jaw 13, followed by extending to the bottom of the hitching arm 2 through the third fixing hole 232, the fourth fixing hole 242, and the fifth fixing hole 252, thereby tightly connecting the hitching ball body 1 and the hitching arm 2.

In the embodiment, the hitching ball body 1 is clamped together with the hitching arm 2 through the horizontal clamping groove 131 of the holding jaw 13, and then tightly connected with the hitching ball body 1 and the hitching arm 2 through the latch 5. Not only is it more stable and safe to use, but it also makes uneasy to detach between the hitching ball body 1 and the hitching arm 2 during a hitching, which makes the hitching hook device more reliable and safe to use.

In the embodiment, the hitching ball body 1 is connected to the fixed plates at different positions through the horizontal clamping groove 131 of the holding jaw 13, thereby adjusting a height of the hitching ball body 1. According to the actual needs, the height of the hitching balls on the hitching arm 2 can be adjusted, making it more flexible to use and more convenient to assembly and disassembly.

In the embodiment, multiple horizontal clamping grooves 131 can be disposed on the holding jaw 13, which are simultaneously clamped to the fixed plates, saving assembly time and improving work efficiency.

In the embodiment, the hitching arm 2 includes a mortise and tenon structure and a plug structure for connecting and fixing the hitching ball body 1. The hitching arm 2 includes a multi section of the mortise and tenon structure for adjusting a distance between the hitching balls and the ground, making it easier for the hitching balls to adapt to other vehicles of different heights that need to be hitched. For different hitching ball bodies 1, a direction of the hitching ball can also be adjusted. In addition, the structures limit the direction of up, down, left, and right translation for hitching ball body 1, and the structures limit the direction of forward and backward translation for the hitching ball body 1 by using the latch 5.

Figure 4:
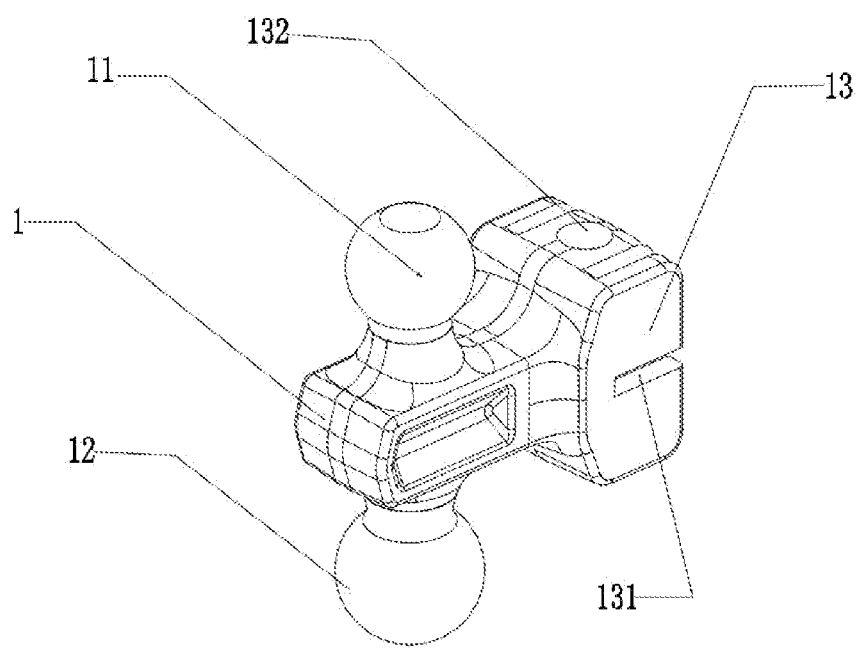
FIG. 4 illustrates a structural schematic diagram of a hitching ball body in the embodiment of the disclosure.
Figure 5:
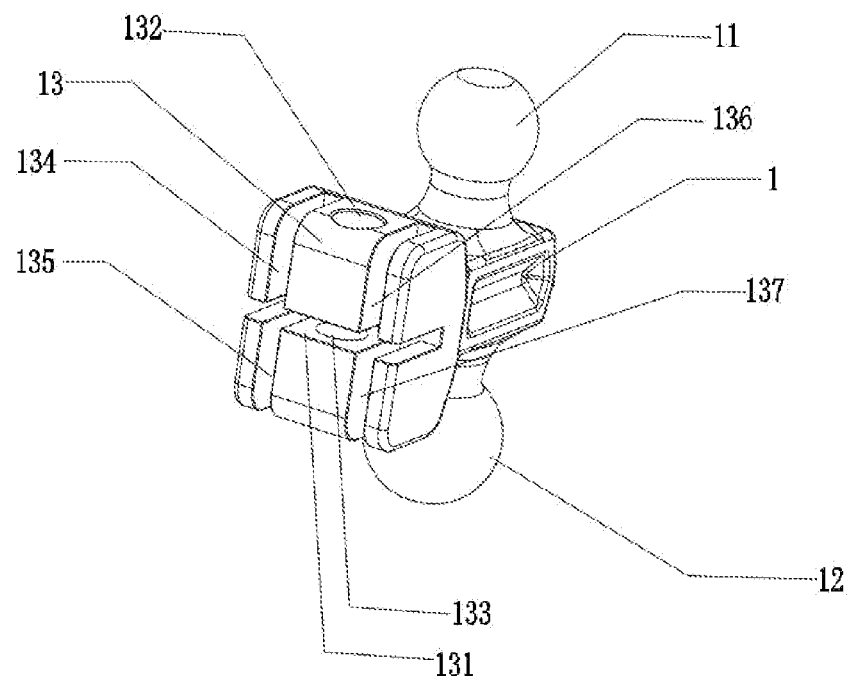
FIG. 5 illustrates another structural schematic diagram of the hitching ball body in the embodiment of the disclosure.

In the embodiment, as shown in FIGS. 4-6, a left side of the holding jaw 13 of the hitching ball body 1 is provided with a first vertical clamping groove 134 and a second vertical clamping groove 135, a right side of the holding jaw 13 of the hitching ball body 1 is provided with a third clamping groove 136 and a fourth clamping groove 137. The first vertical clamping groove 134 and the third vertical clamping groove 136 are disposed at an upper end of the horizontal clamping groove 131, the second vertical clamping groove 135 and the fourth vertical clamping groove 137 are disposed at a lower end of the horizontal clamping groove 131. That is to say, the horizontal clamping groove 131 divides the vertical clamping grooves on two sides of the holding jaw 13 into the upper end and the lower end.

Two sides of the square grooves of the hitching arm 2 include a first side plate 26 and a second side plate 27, when the horizontal clamping groove 131 of the holding jaw 13 is clamped on the fixed plates, the first vertical clamping groove 134 and the second vertical clamping groove 135 are clamped on the first side plate 26, and the third vertical clamping groove 136 and the fourth vertical clamping groove 137 are clamped on the second side plate 27, which makes the connection between the hitching ball body 1 and the hitching arm 2 more stable and complete. Therefore, it is flexible and convenient to use.

In the embodiment, according to the actual needs, the holding jaw 13 can be provided with multiple vertical clamping groove on both sides, making it more convenient and flexible to connect the hitching ball body 1 with the hitching arm 2, greatly improving work efficiency.

In the embodiment, as shown in FIGS. 1-3 and 7, a top end of the latch 5 is provided with a pulling ring 3, and a bottom end of the latch 3 is provided with a first R-shaped pin 6.

In the embodiment, the pulling ring 3 includes a resilient open pin shaft 4, and the pulling ring 3 is connected to the top end of the latch 5 through the resilient open pin shaft 4. For example, the latch 5 defines a hole 51 at its top end for passing through the resilient open pin shaft 4, and the latch defines a hole 52 at its bottom end for passing through the first R-shaped pin 6.

In the embodiment, the bottom of the pulling ring 3 includes a first hanging ear 31 and a second hanging ear 32, the resilient open pin shaft 4 is connected to the pulling ring 3 through the first hanging ear 31 and the second hanging ear 32. The resilient open pin shaft 4 can also rotate the pulling ring 3, making it more convenient to use.

In the embodiment, rubber rings 9 are disposed on the square steel 10, and the rubber ring 9 is used to increase friction and reduce noise when connecting the hitching arm 2 to the RV receiver.

In the embodiment, an iron ring 8 is disposed on the square steel 10, and the iron ring 8 abuts against the rubber rings 9.

In the embodiment, a bottom of the connection between the square steel 10 and the hitching arm 2 is provided with a clamp screw 7, which is used to firmly fix the hitching arm 2 to the RV receiver.

In the embodiment, the iron ring 8 is used to increase a contact area between the clamp screw 7 and the rubber rings 9, making the rubber rings 9 work better.

In the embodiment, sides wall of the square steel 10 can be provided with a first screw hole 101 and a second screw hole 102, and the square steel 10 is provided with a receiver pin 14 for connecting the RV receiver.

The receiver pin 14 can be inserted into the first screw hole 101 or the second screw hole 102 to connect the square steel 10 to the RV receiver.

In the embodiment, the receiver pin 14 is provided with a pin hole 121. A second R-shaped pin 15 is disposed on the receiver pin 14, the second R-shaped pin 15 is connected to the receiver pin 14 through the pin hole 121, and the second R-shaped pin 15 is to prevent the receiver pin 14 from falling off.

The receiver pin 14 and the second R-shaped pin 15 are disposed on the square steel 10, which makes the connection between the square steel 10 and the RV receiver more stable and safe.

The disclosure has a reasonable structure, strong practicality, flexible installation and disassembly, convenient use, and greatly improves work efficiency.

The above are only optional embodiments of the disclosure and do not limit its patent scope. Any equivalent structural changes made using the description and attached drawings of the disclosure, or direct/indirect applications in other related technical fields, are included in the patent protection scope of the disclosure.

What is claimed is:

1. A hitching hook device comprising:
   a hitching ball body and a hitching arm, wherein the hitching arm comprises a square steel configured to connect to a vehicle receiver, and the hitching ball body comprises at least one hitching ball; the hitching ball body further comprises a holding jaw, and at least a horizontal clamping groove is horizontally defined on the holding jaw;
   wherein the hitching arm defines at least two square grooves, a fixing plate is disposed between adjacent two of the at least two square grooves, and a latch is disposed on a top of the hitching arm; the holding jaw of the hitching ball body is clamped to the fixing plate through the horizontal clamping groove, and the latch extends from the top of the hitching arm to a bottom of the hitching arm by passing through the holding jaw.

2. The hitching hook device as claimed in claim 1, wherein the at least one hitching ball comprises two hitching ball, and the two hitching ball are respectively disposed up and down on the hitching ball body.

3. The hitching hook device as claimed in claim 2, wherein the at least two square grooves comprise four square grooves, six square grooves or eight square grooves, and the fixed plate is disposed between every adjacent two of the at least two square grooves.

4. The hitching hook device as claimed in claim 3, wherein two vertical clamping grooves are defined on two sides of the holding jaw of the hitching ball body, and the two vertical clamping grooves are disposed on upper and lower ends of the clamping groove; the two vertical clamping grooves are clamped to side plates of two sides of one of the at least two square grooves.

5. The hitching hook device as claimed in claim 4, wherein a top end of the latch is provided with a pulling ring, and a bottom end of the latch is provided with a first R-shaped pin.

6. The hitching hook device as claimed in claim 5, wherein the pulling ring comprises a resilient open pin shaft, and the pulling ring is connected to the top end of the latch through the resilient open pin shaft.

7. The hitching hook device as claimed in claim 6, wherein rubber rings are disposed on the square steel.

8. The hitching hook device as claimed in claim 7, wherein an iron ring is disposed on the square steel, and the iron ring abuts against the rubber rings.

9. The hitching hook device as claimed in claim 8, wherein a receiver pin configured to connect to the vehicle receiver is disposed on the square steel.

10. The hitching hook device as claimed in claim 9, wherein a second R-shaped pin is disposed on the receiver pin.

11. The hitching hook device as claimed in claim 9, wherein a bottom of a connection between the square steel and the hitching arm is provided with a clamp screw, and the clamp screw is configured to fix the hitching arm to the vehicle receiver.

12. The hitching hook device as claimed in claim 11, wherein sides wall of the square steel are provided with two screw holes, the receiver pin is inserted into the two screw holes to connect the square steel to the vehicle receiver.

13. The hitching hook device as claimed in claim 6, wherein the latch defines a hole at its top end configured for passing through the resilient open pin shaft, and the latch defines a hole at its bottom end configured for passing through the first R-shaped pin.

14. The hitching hook device as claimed in claim 5, wherein a bottom of the pulling ring is provided with two hanging ears, the resilient open pin shaft is connected to the pulling ring through the two hanging ears.

15. A hitching hook device comprising:
   a hitching ball body, comprising at least one hitching ball and a holding jaw fixedly connected to the at least one hitching ball; wherein the holding jaw defines a clamping groove;
   a hitching arm, detachably connected to the hitching ball body; wherein the hitching arm comprises a square steel configured to connect to a vehicle receiver and a fixing plate, the hitching arm defines at least two square grooves, the fixing plate is disposed between adjacent two of the at least two square grooves, and the fixing plate is disposed in the clamping groove; and
   a latch, extending from a top of the hitching arm to a bottom of the hitching arm by passing through the holding jaw to fix the hitching ball body with the hitching arm.

16. The hitching hook device as claimed in claim 15, wherein a top end of the latch is provided with a pulling ring, a bottom end of the latch is provided with an R-shaped pin, and the latch defines two holes configured for passing through the pulling ring and the R-shaped pin.

* * * * *